(12) United States Patent
Lee et al.

(10) Patent No.: US 11,791,706 B2
(45) Date of Patent: Oct. 17, 2023

(54) LOW POWER CONTROL DEVICE USING SLEEP TIMER

(71) Applicant: Power LSI Co.ltd, Daejeon (KR)

(72) Inventors: Won Tae Lee, Bucheon-si (KR); Won Ji Lee, Daejeon (KR); Chang Sik Shin, Chungcheongbuk-do (KR); Chuen Sik Jung, Suwon-si (KR); Gyu Won Lee, Guri-si (KR)

(73) Assignee: POWER LSI CO.LTD, Daejeon (KR)

( * ) Notice: Subject to any disclaimer, the term of this patent is extended or adjusted under 35 U.S.C. 154(b) by 0 days.

(21) Appl. No.: 18/170,057

(22) Filed: Feb. 16, 2023

(65) Prior Publication Data

US 2023/0198369 A1 Jun. 22, 2023

Related U.S. Application Data (63) Continuation of application No. PCT/KR2021/012388, filed on Sep. 13, 2021.

(30) Foreign Application Priority Data

Oct. 15, 2020 (KR) .......................... 10-2020-0133556

(51) Int. Cl.
*H02M 1/08* (2006.01)
*H02M 1/00* (2006.01)
*H02M 3/155* (2006.01)

(52) U.S. Cl.
CPC ........... *H02M 1/0054* (2021.05); *H02M 1/08* (2013.01); *H02M 3/155* (2013.01)

(58) Field of Classification Search
CPC ....... H02M 1/0054; H02M 1/08; H02M 3/155
See application file for complete search history.

(56) References Cited

U.S. PATENT DOCUMENTS

| | | | |
|---|---|---|---|
| 8,559,196 B2 * | 10/2013 | Yang | ................. H02M 3/33507 363/49 |
| 10,686,381 B1 | 6/2020 | Zhang et al. | |
| 2014/0362608 A1 * | 12/2014 | Yang | ................. H02M 3/33576 363/21.01 |
| 2018/0183256 A1 | 6/2018 | Tanaka et al. | |

FOREIGN PATENT DOCUMENTS

| | | |
|---|---|---|
| JP | H04-42771 A | 2/1992 |
| JP | 2014-087159 A | 5/2014 |
| JP | 2018-153079 A | 9/2018 |
| KR | 10-0595868 B1 | 7/2006 |
| KR | 10-2007-0073576 A | 7/2007 |
| KR | 10-1379375 B1 | 3/2014 |
| KR | 10-1504884 B1 | 3/2015 |
| KR | 10-1957062 B1 | 3/2019 |
| KR | 10-2250427 B1 | 5/2021 |

\* cited by examiner

*Primary Examiner* — Kyle J Moody
(74) *Attorney, Agent, or Firm* — NKL Law; Byungwoong Park (57) ABSTRACT

The present invention relates a low power control device using a sleep timer, and more particularly, to a low power control device using a controllable sleep timer which disables each component of a circuit while discharging an output voltage Vo using a control signal of a sleep timer in which a width of an OFF signal is larger than a width of an ON signal in a light load state and sequentially enables each component of the circuit while charging the output voltage in a predetermined order to minimize power consumption according to a loading level of a load.

10 Claims, 7 Drawing Sheets

LOW POWER CONTROL DEVICE USING SLEEP TIMER

TECHNICAL FIELD

The present invention relates to a low power control device using a sleep timer, and more particularly, to a low power control device using a controllable sleep timer which disables each component of a circuit while discharging an output voltage Vo using a control signal of a sleep timer in which a width of an OFF signal is larger than a width of an ON signal in a light load state and sequentially enables the components of the circuit in a predetermined order while charging the output voltage to minimize power consumption according to a loading level of a load.

BACKGROUND ART

Voltage regulation is frequently required to prevent variations in supply voltages in various micro devices such as digital ICs, semiconductor memories, display modules, hard disk drives, RF circuits, microprocessors, digital signal processors, and analog ICs, and especially in applications which use batteries such as cellular phones, notebook computers, and consumer products.

In electronic communication devices, a power supply device which supplies stable power is the most basic part of the system and as such a power supply device, a switching mode power supply device, such as a DC-DC converter is being actively studied.

Korean Registered Patent No. 10-0595868 discloses a DC/DC converter which finds an error voltage between an output voltage and a first reference voltage to control an output current in accordance with a differential voltage between the error voltage and a second reference voltage to generate a desired output voltage from the input voltage.

Korean Registered Patent No. 10-1379375 discloses a dual-output type DC-DC converter device which generates a positive voltage and a negative voltage.

Korean Registered Patent No. 10-1504884 discloses a DC/DC voltage converter.

Korean Registered Patent No. 10-1957062 discloses a dual input signal inductor boost converter.

In the meantime, power converters include a separate circuit to reduce a power used during light load and no-load states. In order to efficiently operate the power converter during the light load and no-load states, a power converter including a low power standby mode may be used.

In the meantime, many techniques have been proposed to improve an efficiency of the converter in a light load condition. For example, Japanese Patent No. H04-42771 discloses a DC-DC converter which reduces a power loss by intermittently driving a duty cycle (PWM) control circuit under the light load condition.

Accordingly, a circuit and a circuit implementation method are requested to minimize the power consumption depending on a loading degree of a load.

SUMMARY

Accordingly, the present invention has been made in an effort to solve the problem as described above, and an object of the present invention is to provide a low power control device using a controllable sleep timer which disables each component of a circuit while discharging an output voltage Vo using a control signal of a sleep timer in which a width of an OFF signal is larger than a width of an ON signal in a light load state and sequentially enables each component of the circuit while charging the output voltage in a predetermined order to minimize power consumption according to a loading level of a load.

A technical object of the exemplary embodiments of the present invention is not limited to the aforementioned objects, and other not-mentioned objects will be obviously understood by those skilled in the art from the description below.

In order to achieve the objects as described above, according to an aspect of the present invention, a low power control device using a sleep timer includes: a low power clock generator 100 which generates and outputs a clock signal; a sleep timer 200 which receives the clock signal and an output voltage Vo in a light load condition to generate a control signal CTL which controls an on/off operation of each component of a circuit; a TON generator 300 which receives an input voltage Vin, the output voltage Vo, and a reference voltage VREF in response to the control signal to generate a signal for controlling a pulse width modulation (PWM); a pulse width modulation (PWM) controller 400 which outputs a pulse width modulation (PWM) signal using an output signal of the TON generator and an output signal of a pulse width modulation (PWM) comparator; a current RAMP 500 which receives current information of an inductor L provided at an output end in response to the control signal to change the current information into a voltage signal; a differential sensing block 600 which senses, differentially amplifies, and outputs the output voltage in response to the control signal; an error amplifier 700 which amplifies an error using the reference voltage and an output signal of the differential sensing block in response to the control signal; the pulse width modulation (PWM) comparator 800 which receives an output signal of the error amplifier and an output signal of the current RAMP in response to the control signal to output a comparison signal; a first gate driver 900 which receives an output signal of the pulse width modulation (PWM) controller in response to the control signal to output a signal for driving a first power MOSFET; and a second gate driver 1000 which receives an output signal of the pulse width modulation (PWM) controller in response to the control signal to output a signal for driving a second power MOSFET.

The sleep timer disables each component of the circuit while discharging the output voltage Vo and sequentially enables each component of the circuit in a predetermined order while charging the output voltage.

The first power MOSFET has a capacity larger than that of the second power MOSFET.

The first gate driver is controlled to operate when a load of the output end is a heavy load.

The second gate driver is controlled to operate when a load of the output end is a light load.

The TON generator 300 includes: an inverter 301 which receives the pulse width modulation (PWM) signal to output an inverted signal; a switch 302 which is switched according to an output signal of the inverter; a current source 303 which generates a current using the input voltage and the output voltage; a capacitor 304 provided between an output of the current source and the ground GND; and a comparator 305 having a negative terminal which is connected to an output of the current source and a positive terminal which is connected to the reference voltage VREF so that an output signal is changed according to the reference voltage VREF.

The current source satisfies the following Equation 3:

$$I = K \times (I_{VIN}/I_{VO}) \qquad \text{[Equation 3]}$$

(Here, $I_{VIN}$ is an input current, $I_{VO}$ is an output current, and K is a compensation value).

In the comparator 305, when the pulse width modulation (PWM) signal is logic high (H, High, "1"), the capacitor is charged and a rising edge is generated and when the voltage charged in the capacitor is equal to the reference voltage VREF of the comparator, a falling edge is generated.

An output end of the error amplifier includes: a first resistor Rc and a first capacitor Cc connected in series between the output end of the error amplifier and a ground GND; and a second capacitor Cz provided between the output end of the error amplifier and the ground.

When it is assumed that a logic high period of the control signal CTL is $D_{ON}$, and the logic low period is $D_{OFF}$, an average power of the circuit is expressed by the following Equation 4"

$$P_{AVG}=[D \times P_{ON}]+[(1-D) \times P_{OFF}] \quad \text{[Equation 4]}$$

(Here, $P_{AVG}$ is an average power, $P_{ON}$ is a power when each component of the circuit is in an ON state, $P_{OFF}$ is a power when each component of the circuit is in an OFF state, D is a ratio of ON (signal) which is $D_{ON}/(D_{ON}+D_{OFF})$, $D_{ON}$ is a width of the ON signal, and $D_{OFF}$ is a width of the OFF signal).

According to the low power control device using a sleep timer according to an exemplary embodiment of the present invention, it is possible to control each component of the circuit to be disabled while discharging the output voltage Vo and each component of the circuit to be sequentially enabled according to a predetermined order while charging the output voltage, using a control signal of the sleep timer in which a width of an OFF signal is larger than a width of an ON signal in a light load state.

According to the low power control device using a sleep timer according to an exemplary embodiment of the present invention, a gate driver having a different capacity is selected depending on the loading degree of the load to further reducing the power consumption.

According to the low power control device using a sleep timer according to an exemplary embodiment of the present invention, each component of the circuit is sequentially enabled according to a predetermined order to further reduce the power consumption.

Further, the low power control device using a sleep timer according to an exemplary embodiment of the present invention may be used for a buck converter, a boost converter, a buck-boost converter, a DC-DC converter, an AC-DC converter, a linear regulator, and a circuit which requires low-power driving to be used in various forms.

DESCRIPTION OF REFERENCE NUMERALS AND SIGNS

| | |
|---|---|
| 100: Low power clock generator | 200: Sleep timer |
| 300: TON generator | 400: Pulse width modulation (PWM) controller |
| 500: Current RAMP | 600: Differential sensing block |
| 700: Error amplifier | 800: PWM Comparator |
| 900: First gate driver | 1000: Second gate driver |
| 201: Power switch | 202: Modulator |
| 203: Error signal generator | 204: Sensor gain |
| 301: Inverter | 302: Switch |
| 303: Current source | 304: Capacitor |
| 305: Comparator | |

DETAILED DESCRIPTION OF EMBODIMENTS

Those skilled in the art may make various modifications to the present invention and the present invention may have various embodiments thereof, and thus specific embodiments will be illustrated in the drawings and described in detail. However, this does not limit the present invention within specific exemplary embodiments, and it should be understood that the present invention covers all the modifications, equivalents, and replacements within the spirit and technical scope of the present invention.

It should be understood that, when it is described that an element is "coupled" or "connected" to another element, the element may be directly coupled or directly connected to the other element or coupled or connected to the other element through a third element.

In contrast, when it is described that an element is "directly coupled" or "directly connected" to another element, it should be understood that no element is present therebetween.

Terms used in the present specification are used only to describe specific exemplary embodiments, and are not intended to limit the present invention. A singular form may include a plural form if there is no clearly opposite meaning in the context. In the present application, it should be understood that terminology "include" or "have" indicates that a feature, a number, a process, an operation, a component, a part, or the combination thereof described in the specification is present, but does not exclude a possibility of presence or addition of one or more other features, numbers, processes, operations, components, parts, or combinations thereof, in advance.

Unless otherwise defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present invention.

Hereinafter, the present invention will be described in detail with reference to accompanying drawings. Prior to this, terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. The terminologies including technical terms and scientific terms used herein have the same meanings that those skilled in the art generally understand, if not defined, and the detailed description of a related known function or configuration that may make the purpose of the present invention unnecessarily ambiguous in describing the present invention will be omitted in the following description and accompanying drawings. The drawings to be introduced below are provided for sufficiently conveying the concept of the present invention to those skilled in the art. Therefore, the present invention is not limited to the following drawings, but can be specified in the other forms. Further, like reference numerals designate like elements throughout the specification. In the drawings, it should be noted that the same elements will be designated by the same reference numerals although they are shown in different drawings.

Figure 1:
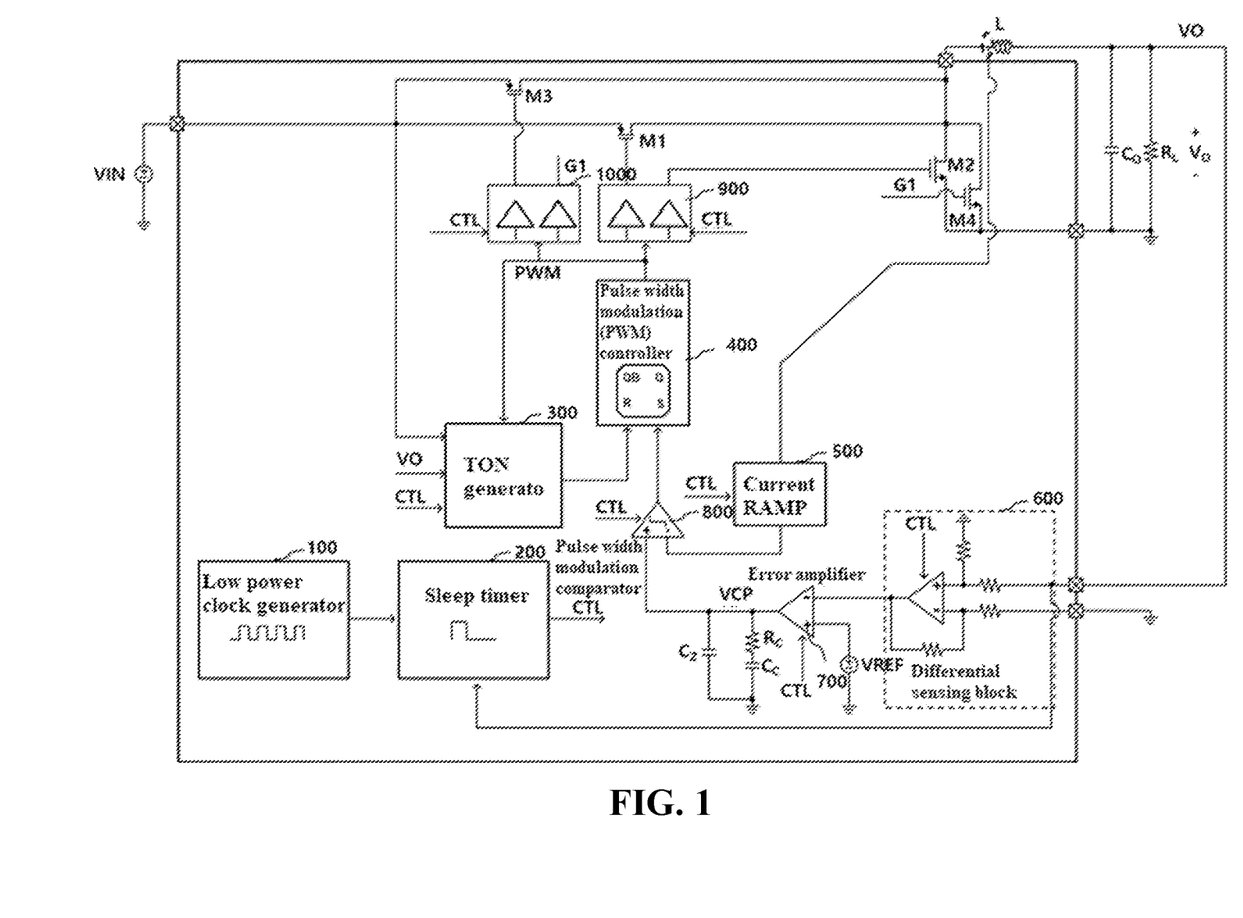
FIG. 1 is a diagram of a low power control device using a sleep timer according to an exemplary embodiment of the present invention.

FIG. 1 is a diagram of a low power control device using a sleep timer according to an exemplary embodiment of the present invention.

As illustrated in FIG. 1, a low power control device using a sleep timer according to an exemplary embodiment of the present invention includes a low power clock generator (adaptive reference generator) 100, a sleep timer 200, a TON generator 300, a pulse width modulation (PWM) controller 400, a current RAMP 500, a differential sensing block 600, an error amplifier 700, a pulse width modulation (PWM) comparator 800, a first gate driver 900, and a second gate driver 1000.

The low power clock generator 100 generates and outputs a clock signal. The low power clock generator 100 may generate a clock signal when it is "a light load".

The sleep timer 200 receives the clock signal and the output voltage Vo to generate and output a control signal CTL which controls an on/off operation of each component of the circuit.

The TON generator 300 receives an input voltage Vin, an output voltage Vo, and a reference voltage VREF in response to the control signal CTL to generate a signal which controls the pulse width modulation (PWM) controller 400.

The pulse width modulation (PWM) controller 400 outputs a pulse width modulation (PWM) signal using an output signal VREF of the TON generator 300 and an output signal of the pulse width modulation (PWM) comparator 800.

The current RAMP 500 receives current information of an inductor L equipped in an output end in response to the control signal CTL to change the current information into a voltage signal and output the voltage signal.

The differential sensing block 600 senses and differentially amplifies the output voltage Vo in response to the control signal CTL to output the voltage.

The error amplifier 700 amplifies an error using the reference voltage VREF and the output signal of the differential sensing block 600 in response to the control signal CTL.

For loop stabilization, an output end VCP of the error amplifier 700 includes a first resistor Rc and a first capacitor Cc which are connected in series between an output end of the error amplifier 700 and a ground GND and a second capacitor Cz provided between the output end of the error amplifier 700 and the ground.

The pulse width modulation (PWM) comparator 800 receives an output signal of the error amplifier 700 and an output signal of the current RAMP 500 in response to the control signal CTL to output a comparison signal to the pulse width modulation (PWM) controller 400.

The first gate driver 900 receives an output signal PWM of the pulse width modulation (PWM) controller 400 in response to the control signal CTL to output a signal which drives power MOSFETs M1 and M2.

The second gate driver 1000 receives an output signal PWM of the pulse width modulation (PWM) controller 400 in response to the control signal CTL to output a signal which drives power MOSFETs M3 and M4.

When the power MOSFETs M1 and M2 are designed to have a capacity larger than that of the power MOSFETs M3 and M4, the first gate driver 900 is controlled to operate when a load of the output end is a heavy load and the second gate driver 1000 is controlled to operate when a load of the output end is a light load.

The sleep timer 200 disables each component of the circuit while discharging the output voltage Vo and sequentially enables each component of the circuit in a predetermined order while charging the output voltage.

Figure 2:
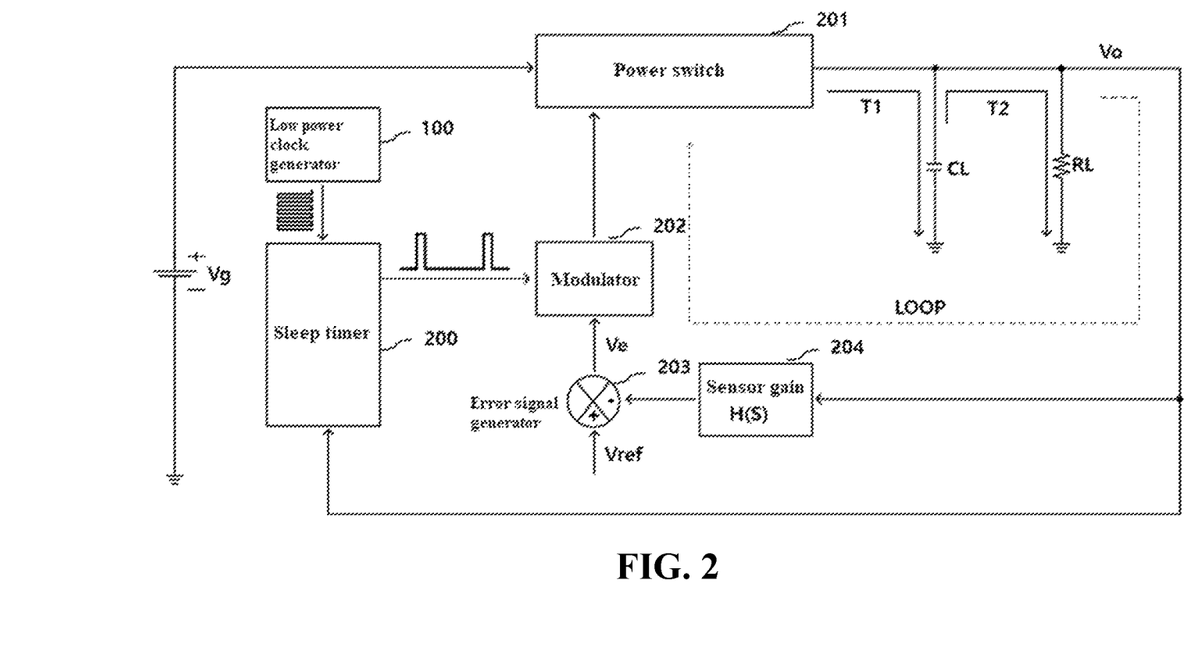
FIG. 2 is a conceptual view of a low power control device using a sleep timer according to an exemplary embodiment of the present invention.

FIG. 2 is a conceptual view of a low power control device using a sleep timer according to an exemplary embodiment of the present invention.

As illustrated in FIG. 2, the low power control device using a sleep timer includes a low power clock generator (adaptive reference generator) 100, a sleep timer 200, a power switch 201, a modulator 202, an error signal generator 203, and a sensor gain H(S) 204.

Here, the power switch 201 includes the gate driver and the power MOSFET, the modulator 202 refers to a comparator, the error signal generator 203 refers to an error amplifier, and the sensor gain H(S) refers to a differential sensing amplifier.

FIG. 2 illustrates a concept for a loop for low power consumption in a light load condition and the sleep timer 200 receives a value obtained by monitoring a level of the output voltage Vo and an output signal of the low power clock generator 100 as an input to generate a control signal for controlling internal components.

Figure 3:
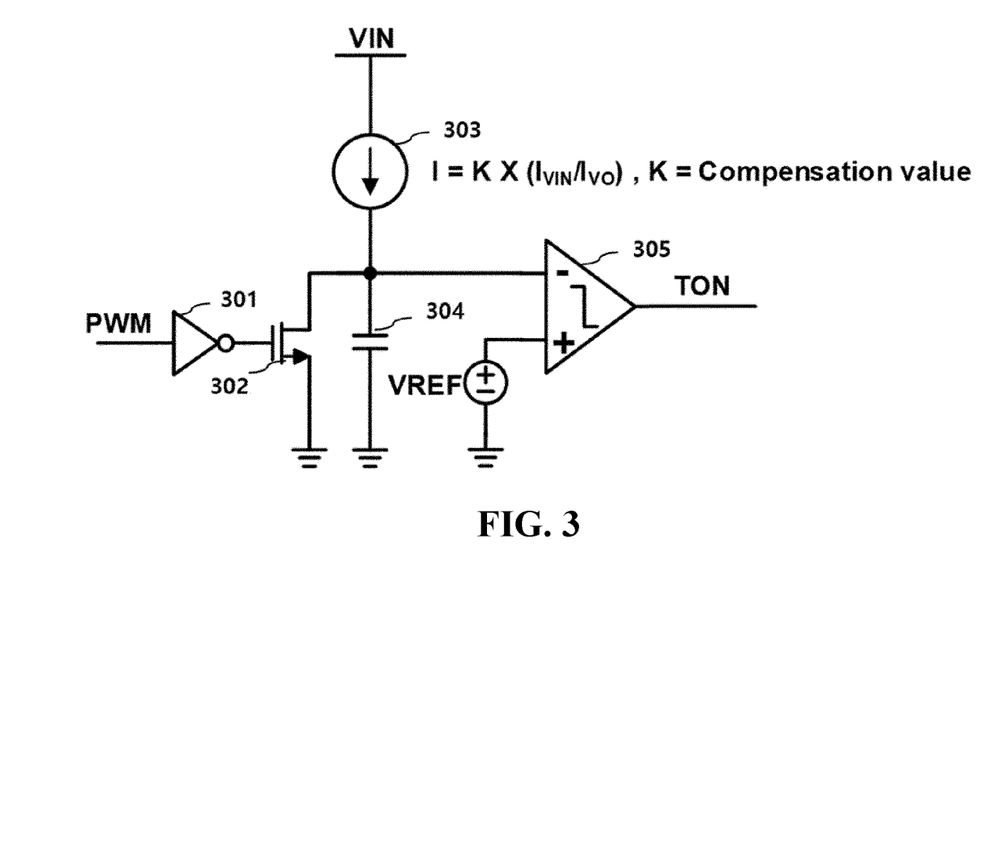
FIG. 3 is a diagram of an exemplary embodiment of a TON generator of FIG. 1.

FIG. 3 is a diagram of an exemplary embodiment of a TON generator of FIG. 1.

As illustrated in FIG. 3, the TON generator 300 of FIG. 1 includes an inverter 301, a switch 302, a current source 303, a capacitor 304, and a comparator 305.

The inverter 301 receives the pulse width modulation (PWM) signal to output an inverted signal.

The switch 302 is switched according to the output signal of the inverter 301.

The current source 303 generates a current using the input voltage Vin and the output voltage Vo.

The current source 303 satisfies the following Equation 1:

$$I = K \times (I_{VIN}/I_{VO}) \qquad \text{[Equation 1]}$$

Here, $I_{VIN}$ is an input current, $I_{VO}$ is an output current, and K is a compensation value.

The capacitor 304 is provided between an output of the current source 303 and a ground GND.

A negative terminal of the comparator 305 is connected to an output of the current source 303 and a positive terminal is connected to the reference voltage VREF so that an output signal is changed according to the reference voltage VREF.

In the comparator 305, when the pulse width modulation (PWM) signal is logic high (H, High, "1"), the capacitor 304 is charged and a rising edge is generated.

Thereafter, when a voltage charged in the capacitor 304 is equal to the reference voltage VREF of the comparator 305, a falling edge is generated.

The TON generator 300 changes a duty in accordance with the change in the input reference voltage VREF.

Figure 4:
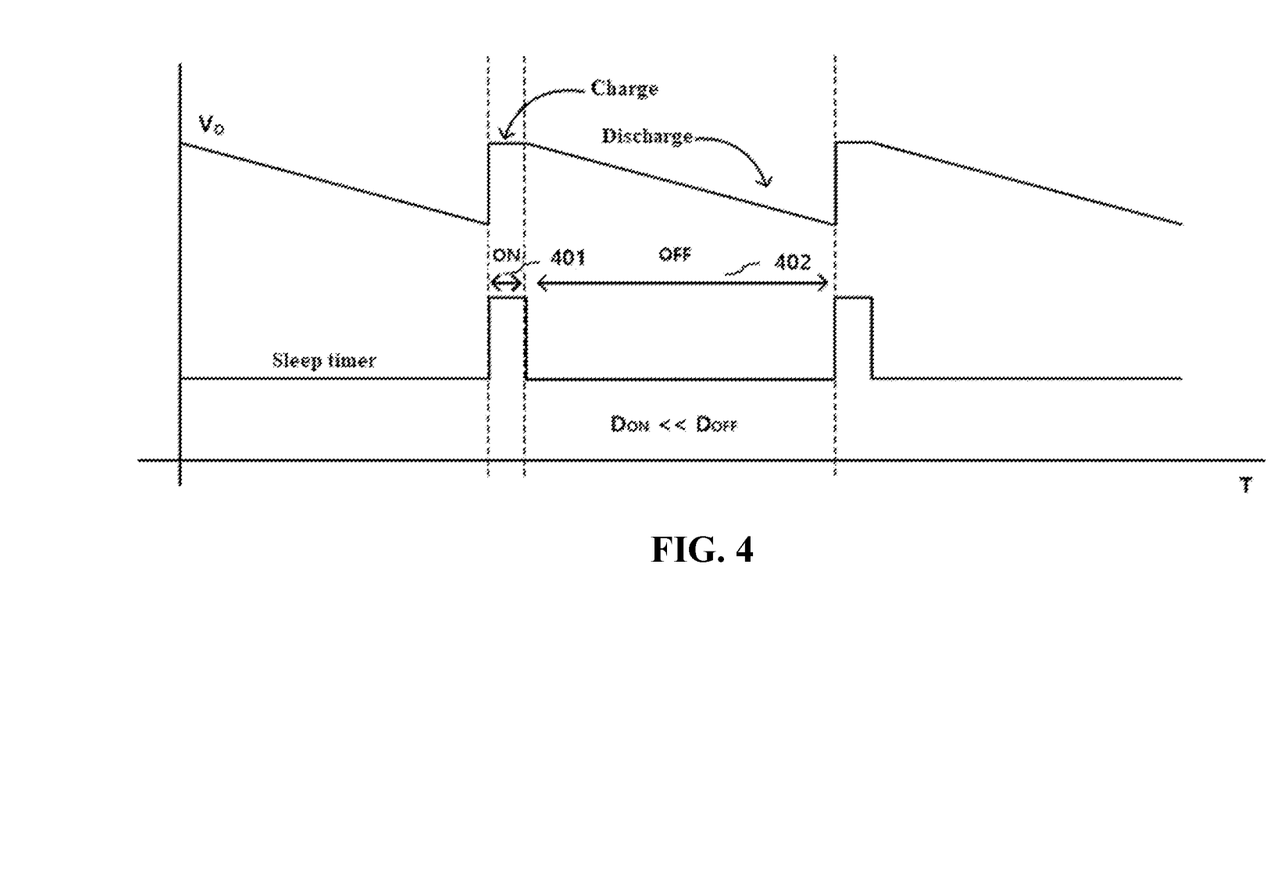
FIG. 4 is a view for explaining an output voltage and a control signal of a sleep timer in a circuit including a low power control device using a sleep timer according to an exemplary embodiment of the present invention.

FIG. 4 is a view for explaining an output voltage and a control signal of a sleep timer in a circuit including a low power control device using a sleep timer according to an exemplary embodiment of the present invention.

As illustrated in FIG. 4, when a load is a light load, the control signal CTL of the sleep timer 200 is on 401 during a period when the output voltage Vo is charged and is off 401 during a period when the output voltage Vo is discharged.

Figure 5A:
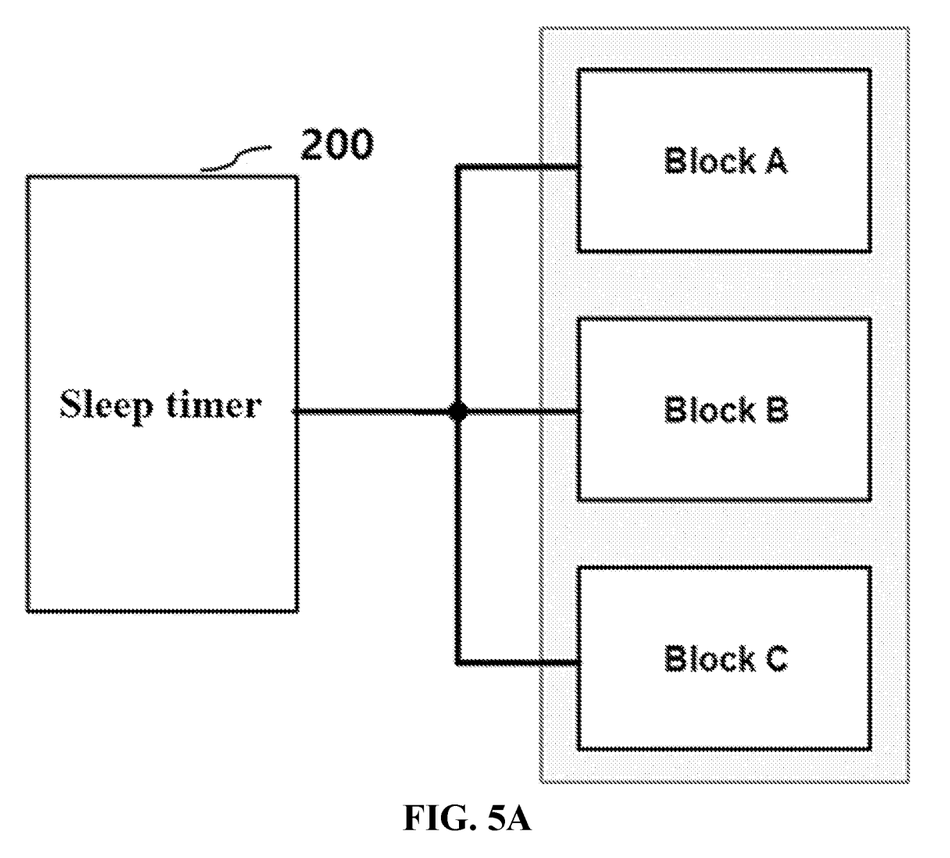
FIG. 5A is a view for explaining off-control of a sleep timer in a circuit including a low power control device using a sleep timer according to an exemplary embodiment of the present invention.
Figure 5B:
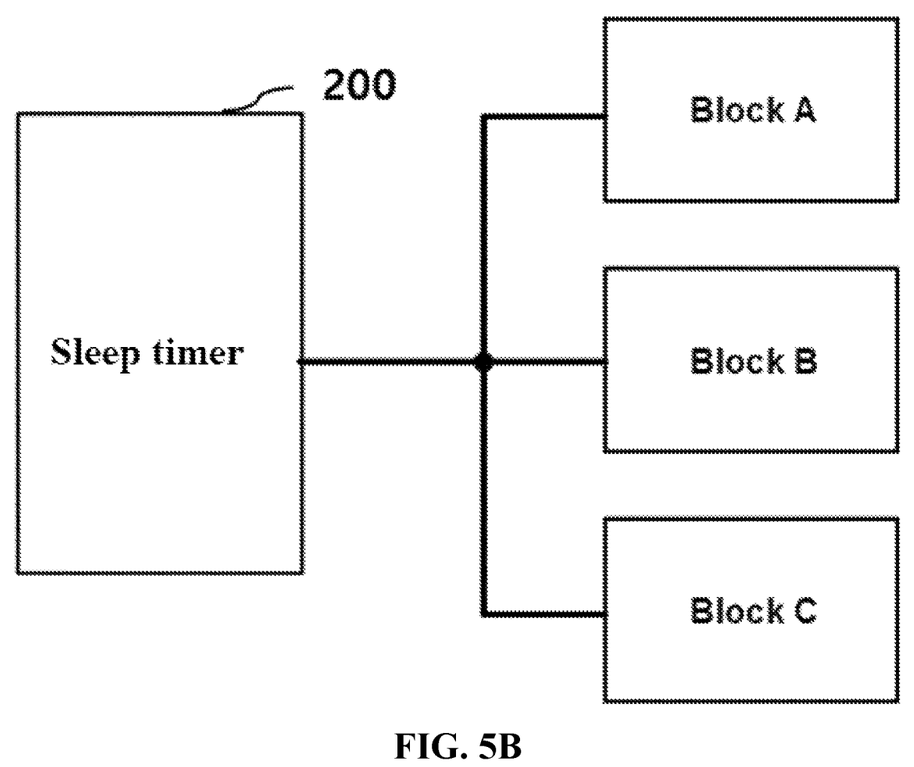
FIG. 5B is a view for explaining on-control of a sleep timer in a circuit including a low power control device using a sleep timer according to an exemplary embodiment of the present invention.

FIG. 5A is a view for explaining off-control of a sleep timer in a circuit including a low power control device using a sleep timer according to an exemplary embodiment of the present invention and FIG. 5B is a view for explaining on-control of a sleep timer in a circuit including a low power control device using a sleep timer according to an exemplary embodiment of the present invention.

As illustrated in FIG. 5A, during the period when the sleep timer 200 is off, all Block A, Block B, and Block C are disabled to be in a sleep mode state.

In the meantime, as illustrated in FIG. 5B, during a period when the sleep timer 200 is on, if a state is changed from the off state to the on state, blocks are sequentially exited from the sleep mode to be enabled. For example, Block A, Block B, and Block C may be enabled in this order.

Figure 6:
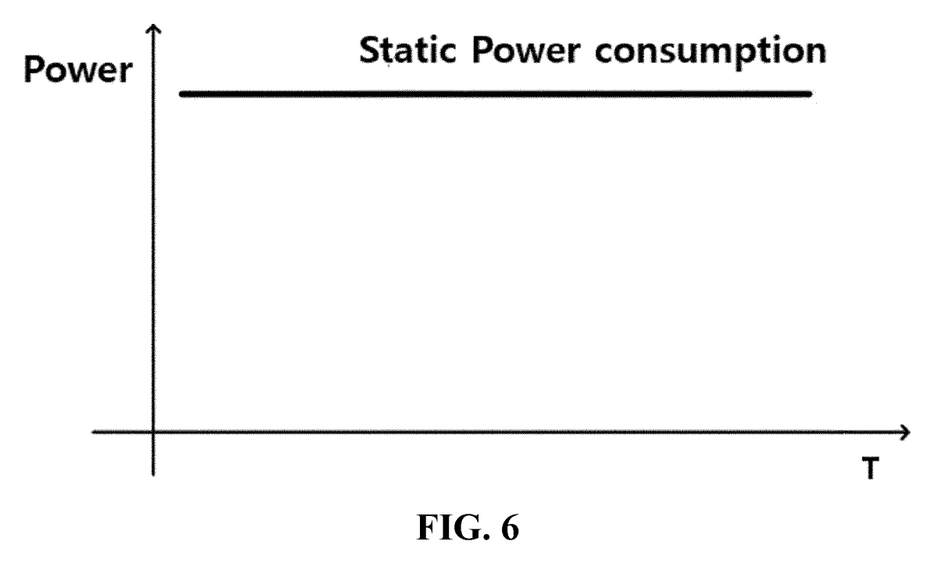
FIG. 6 is a view for explaining a power consumed in an existing circuit which does not have a sleep timer.

FIG. 6 is a view for explaining a power consumed in an existing circuit which does not have a sleep timer.

As illustrated in FIG. 6, when the control is performed by the existing method, in a state in which a constant current flows, the consumed power has a constant value without being changed as the time elapses.

Figure 7:
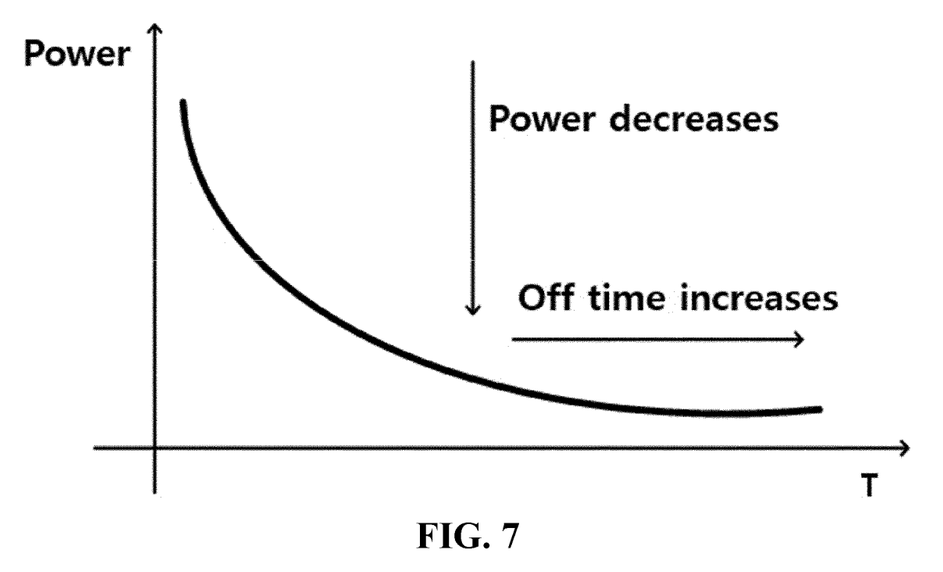
FIG. 7 is a view for explaining a power consumed in a circuit including a low power control device using a sleep timer according to an exemplary embodiment of the present invention.

FIG. 7 is a view for explaining a power consumed in a circuit including a low power control device using a sleep timer according to an exemplary embodiment of the present invention.

As illustrated in FIG. 7, in the low power control device using a sleep timer according to the present invention, in a state in which a constant current flows under a light load condition, a power to be consumed is reduced in accordance with a maintaining time of the off signal of the sleep timer 200.

If it is assumed that a width of the on signal of the sleep timer 200 is $D_{ON}$ and a width of the off signal is $D_{OFF}$, as the $D_{OFF}$ is longer than $D_{ON}$, the power consumption is low so that an average power $P_{AVG}$ is low.

When it is assumed that a logic high (High, "1") period of the control signal CTL is $D_{ON}$ and a logic low (Low, "0") period is $D_{OFF}$, an average power of a circuit including a low power control device using the sleep timer is expressed by the following Equation 2:

$$P_{AVG}=[D \times P_{ON}]+[(1-D) \times P_{OFF}]  \quad \text{[Equation 2]}$$

Here, $P_{AVG}$ is an average power, $P_{ON}$ is a power when each component of the circuit is in an ON state, $P_{OFF}$ is a power when each component of the circuit is in an OFF state, D is a ratio of ON (signal) which is $D_{ON}/(D_{ON}+D_{OFF})$, DON is a width of the ON signal, and $D_{OFF}$ is a width of the OFF signal.

The longer the maintaining time of the off signal of the sleep timer 200, the lower the power consumption.

Further, in the light load condition, an input effective capacitance may be changed to be low.

The present invention is not limited to the above-described exemplary embodiment and has various applicable ranges and various modifications can be made without departing from the gist of the present invention claimed in the claims.

The invention claimed is:

1. A low power control device using a sleep timer, comprising:
   a low power clock generator which generates and outputs a clock signal;
   the sleep timer which receives the clock signal and an output voltage in a predetermined light load condition to generate a control signal which controls an on/off operation of each component of a circuit;
   a TON generator which receives an input voltage, the output voltage, and a reference voltage in response to the control signal to generate a signal for controlling a pulse width modulation;
   a pulse width modulation controller which outputs a pulse width modulation signal using an output signal of the TON generator and an output signal of a pulse width modulation comparator;
   a current RAMP which receives current information of an inductor provided at an output end of the low power control device in response to the control signal to change the current information into a voltage signal;
   a differential sensing block which senses, differentially amplifies, and outputs the output voltage in response to the control signal;
   an error amplifier which amplifies an error using the reference voltage and an output signal of the differential sensing block in response to the control signal;
   a pulse width modulation comparator which receives an output signal of the error amplifier and an output signal of the current RAMP in response to the control signal to output a comparison signal;
   a first gate driver which receives an output signal of the pulse width modulation controller in response to the control signal to output a signal for driving a first power MOSFET; and
   a second gate driver which receives an output signal of the pulse width modulation controller in response to the control signal to output a signal for driving a second power MOSFET.

2. The low power control device using the sleep timer according to claim 1, wherein the sleep timer disables each component of the circuit while discharging the output voltage and sequentially enables each component of the circuit in a predetermined order while charging the output voltage.

3. The low power control device using the sleep timer according to claim 1, wherein the first power MOSFET has a capacity larger than that of the second power MOSFET.

4. The low power control device using the sleep timer according to claim 3, wherein the first gate driver is controlled to operate when a load of the output end of the low power control device is a predetermined heavy load condition.

5. The low power control device using the sleep timer according to claim 3, wherein the second gate driver is controlled to operate when a load of the output end of the low power control device is the predetermined light load condition.

6. The low power control device using the sleep timer according to claim 1, wherein the TON generator includes:
   an inverter which receives the pulse width modulation signal to output an inverted signal;
   a switch which is switched according to an output signal of the inverter;
   a current source which generates a current using the input voltage and the output voltage;
   a capacitor provided between an output of the current source and a ground; and
   a comparator in which a negative terminal is connected to the output of the current source and a positive terminal is connected to the reference voltage so that an output signal of the comparator is changed according to the reference voltage.

7. The low power control device using the sleep timer according to claim 6, wherein the current source satisfies the following Equation 3:

$$I = K \times (I_{VIN}/I_{VO}) \quad \text{[Equation 3]}$$

(Here, $I_{VIN}$ is an input current, $I_{VO}$ is an output current, and K is a compensation value).

8. The low power control device using the sleep timer according to claim 6, wherein in the comparator, when the pulse width modulation signal is a predetermined logic high, the capacitor is charged and a rising edge is generated and when the voltage charged in the capacitor is equal to the reference voltage of the comparator, a falling edge is generated.

9. The low power control device using the sleep timer according to claim 1, wherein an output end of the error amplifier includes:
   a first resistor and a first capacitor connected in series between the output end of the error amplifier and a ground; and
   a second capacitor provided between the output end of the error amplifier and the ground.

10. The low power control device using the sleep timer according to claim 1, wherein when it is assumed that a logic high period of the control signal is $D_{ON}$, and a logic low period is $D_{OFF}$, an average power of the circuit is expressed by the following Equation 4:

$$P_{AVG} = [D \times P_{ON}] + [(1-D) \times P_{OFF}] \quad \text{[Equation 4]}$$

(Here, $P_{AVG}$ is an average power, $P_{ON}$ is a power when each component of the circuit is in an ON state, $P_{OFF}$ is a power when each component of the circuit is in an OFF state, D is a ratio of ON (signal) which is $D_{ON}/(D_{ON}+D_{OFF})$, $D_{ON}$ is a width of the ON signal, and $D_{OFF}$ is a width of the OFF signal).

* * * * *